United States Patent
Kanamarlapudi et al.

(10) Patent No.: US 9,444,753 B2
(45) Date of Patent: Sep. 13, 2016

(54) METHODS AND APPARATUS FOR IMPROVING CALL PERFORMANCE AND DATA THROUGHPUT

(71) Applicant: QUALCOMM Incorporated, San Diego, CA (US)

(72) Inventors: Sitaramanjaneyulu Kanamarlapudi, San Diego, CA (US); Babla Lamba, San Diego, CA (US); Chetan Gopalakrishnan Chakravarthy, San Diego, CA (US); Krishna Chaitanya Bellam, Hyderbad (IN); Arvindhan Kumar, San Diego, CA (US); Luna Sapna D'Souza, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/158,748

(22) Filed: Jan. 17, 2014

(65) Prior Publication Data

US 2014/0362699 A1    Dec. 11, 2014

Related U.S. Application Data

(60) Provisional application No. 61/833,064, filed on Jun. 10, 2013.

(51) Int. Cl.
*G01R 31/08* (2006.01)
*G06F 11/00* (2006.01)
(Continued)

(52) U.S. Cl.
CPC ............. *H04L 47/34* (2013.01); *H04L 1/1829* (2013.01); *H04L 1/1841* (2013.01); *H04W 28/06* (2013.01)

(58) Field of Classification Search
CPC .............................. H04L 47/34; H04W 28/06
See application file for complete search history.

(56) References Cited

U.S. PATENT DOCUMENTS 8,379,855 B2    2/2013    Kubota et al.
2002/0110095 A1    8/2002    Jiang et al.
(Continued)

FOREIGN PATENT DOCUMENTS

EP    2267931 A2    12/2010

OTHER PUBLICATIONS

3GPP TS 25.322: "Universal Mobile Telecommunications System (UMTS); Radio Link Control (RLC) protocol specification," ETSI TS 125 322, Release 11, Version 11.2.0, Technical Specification, European Telecommunications Standards Institute (ETSI), 650, Route des Lucioles; F-06921, Sophia-Antipolis; France, vol. 3GPP RAN 2, No. V11.2.0, Apr. 1, 2013, XP014156473, 94 pages, Sections 4.2.1.2 and 11.2.
International Search Report and Written Opinion—PCT/US2014/041354—ISA/EPO—Oct. 30, 2014. (11 total pages).

*Primary Examiner* — Derrick Ferris
*Assistant Examiner* — Farhad Ali
(74) *Attorney, Agent, or Firm* — Arent Fox LLP

(57) ABSTRACT

Methods and apparatus are described for improving call performance and data throughput. The methods and apparatus include receiving one or more packet data units (PDUs) during a transmission time interval (TTI) from a network entity, wherein the one or more PDUs are associated with a radio bearer. Further, the methods and apparatus include determining one or more out-of-order PDUs from the one or more PDUs. Moreover, the methods and apparatus include reordering the one or more out-of-order PDUs, wherein the one or more out-of-order PDUs are reordered within the TTI. Additionally, the methods and apparatus include processing the one or more reordered PDUs.

22 Claims, 9 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04L 12/801* (2013.01)
*H04W 28/06* (2009.01)
*H04L 1/18* (2006.01)

(56) References Cited

U.S. PATENT DOCUMENTS

| | | |
|---|---|---|
| 2005/0270996 A1 | 12/2005 | Yi et al. |
| 2009/0168723 A1 | 7/2009 | Meylan |
| 2012/0155438 A1* | 6/2012 | Shin .................... H04W 28/065 370/336 |
| 2015/0135024 A1* | 5/2015 | Caverni .............. G06F 11/0793 714/704 |

* cited by examiner

METHODS AND APPARATUS FOR IMPROVING CALL PERFORMANCE AND DATA THROUGHPUT

CLAIM OF PRIORITY UNDER 35 U.S.C. §119

The present application for patent claims priority to Provisional Application No. 61/833,064 entitled "Handling RLC UM Out of Order PDUs in one TTI" filed Jun. 10, 2013, and assigned to the assignee hereof and hereby expressly incorporated by reference herein.

BACKGROUND

Aspects of the present disclosure relate generally to wireless communication systems, and more particularly, to improving call performance and data throughput.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In some wireless communication systems, packet data units (PDUs) may be received out of order by a user equipment (UE). As a result, the UE may process the received PDUs out of order without waiting for any missing PDUs as there are no retransmissions. Thus, improvements in call PDU processing are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method of enhanced status retransmission in wireless communication comprises receiving one or more packet data units (PDUs) during a transmission time interval (TTI) from a network entity, wherein the one or more PDUs are associated with a radio bearer. The method further comprises determining one or more out-of-order PDUs from the one or more PDUs. Moreover, the method comprises reordering the one or more out-of-order PDUs, wherein the one or more out-of-order PDUs are reordered within the TTI. Additionally, the method comprises processing the one or more reordered PDUs.

Further aspects provide a computer program product for enhanced status retransmission in wireless communication comprising a computer-readable medium includes at least one instruction for receiving one or more packet data units (PDUs) during a transmission time interval (TTI) from a network entity, wherein the one or more PDUs are associated with a radio bearer. The computer program product further comprises at least one instruction for determining one or more out-of-order PDUs from the one or more PDUs. Moreover, the computer program product comprises at least one instruction for reordering the one or more out-of-order PDUs, wherein the one or more out-of-order PDUs are reordered within the TTI. Additionally, the computer program product comprises at least one instruction for processing the one or more reordered PDUs.

Additional aspects provide an apparatus for communication comprises means for receiving one or more packet data units (PDUs) during a transmission time interval (TTI) from a network entity, wherein the one or more PDUs are associated with a radio bearer. The apparatus further comprises means for determining one or more out-of-order PDUs from the one or more PDUs. Moreover, the apparatus comprises means for reordering the one or more out-of-order PDUs, wherein the one or more out-of-order PDUs are reordered within the TTI. Additionally, the apparatus comprises means for processing the one or more reordered PDUs.

In an additional aspect, an apparatus for communication comprises a memory storing executable instructions and a processor in communication with the memory, wherein the processor is configured to execute the instructions to receive one or more packet data units (PDUs) during a transmission time interval (TTI) from a network entity, wherein the one or more PDUs are associated with a radio bearer. The processor is further configured to determine one or more out-of-order PDUs from the one or more PDUs. Moreover, the processor is configured to reorder the one or more out-of-order PDUs, wherein the one or more out-of-order PDUs are reordered within the TTI. Additionally, processor is configured to process the one or more reordered PDUs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
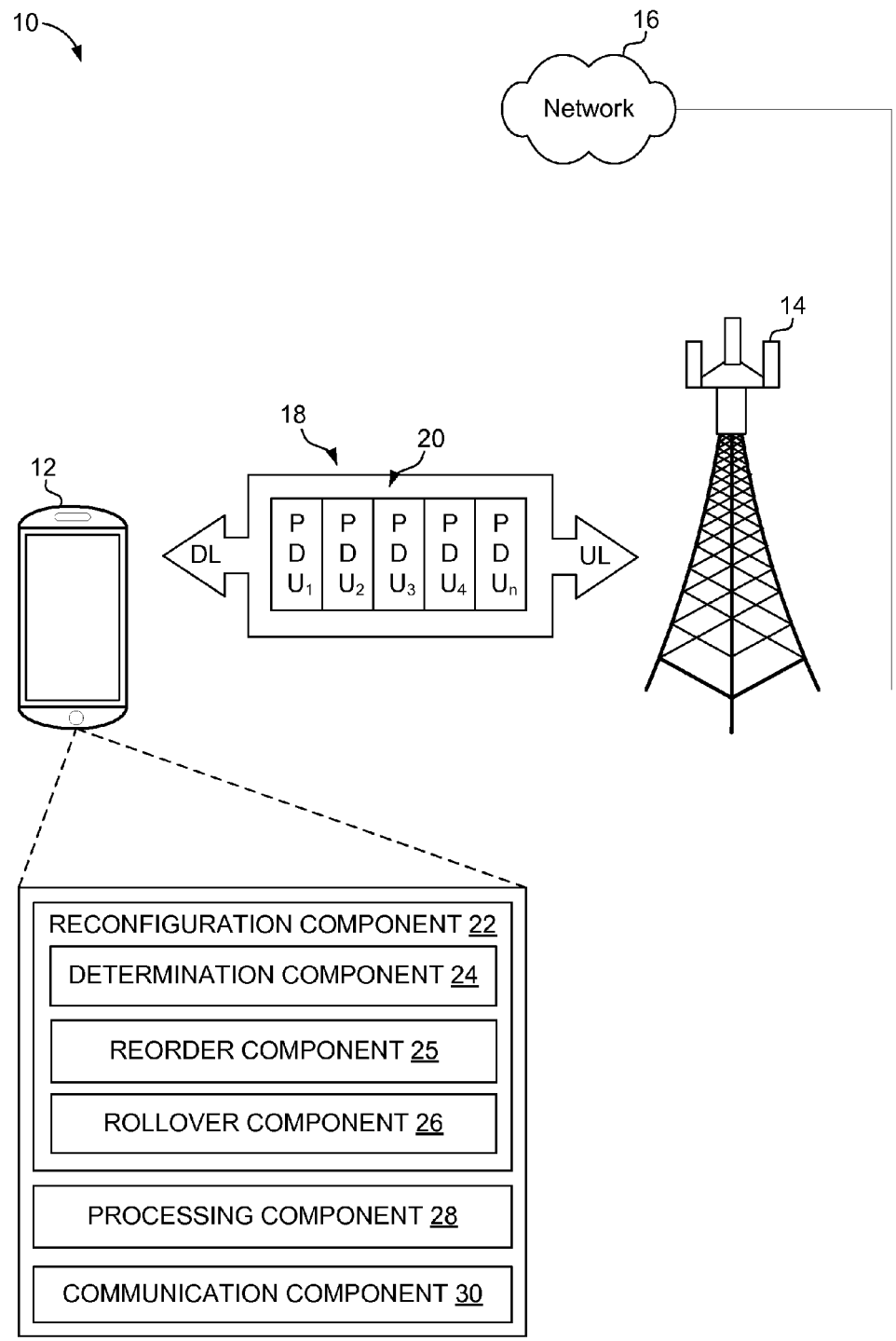
FIG. 1 is a schematic diagram of a communication network including an aspect of a user equipment that may improve call performance and data throughput.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to improving call performance and data throughput by rearranging out-of-order PDUs. Specifically, some user equipments (UEs) may be configured to transmit and receive data (e.g., packet data units (PDUs)) to and from a network entity. In some instances, UE may receive the PDUs out-of-order. For instance, the network entity may send PDUs in a certain sequence, but as a result of poor network conditions and/or poor network connection, the UE may receive the PDUs in a different sequence than which they were sent. If there are no retransmissions, the UE may process the PDUs out-of-order without waiting for any missing PDUs, for example in a Radio Link Control (RLC) unacknowledged mode (UM) of operation.

In some instances, PDUs (e.g., RLC UM PDUs) may have sequence numbers (SNs) that correspond to the order for which they should be processed, and are 7 bits in length with a maximum value of 127. Normally, when subsequent SNs of subsequent PDUs transition from 127 to 0 a rollover event has occurred, and the frame needs to be incremented so that processing may occur properly. However, as noted above, the UE may process the incoming PDUs on a first-in, first-out (FIFO) basis without waiting for any missing PDUs as there are no retransmissions. As a result, the UE may be susceptible to lost PDUs. For example, if UE is expecting a PDU with corresponding SN X (X being any integer value) and if UE receives a PDU with corresponding SN X+1, UE assumes that the PDU with corresponding SN X is missing and handles the SN X+1 as per the reassembly logics. With this, UE may be ready to handle the next PDU SN X+2. If the PDU with corresponding SN X is received at this point, UE may assume that this SN is received after a rollover event has occurred, and may handle the PDU with corresponding SN X as per the RLC reassembly logics. As part of the rollover, the Hyper Frame Number (HFN) is incremented, and the PDU with corresponding SN X is deciphered using the wrong HFN. In an aspect, the HFN is 25 bits in length, and may be incremented at each SN cycle (e.g., at each RLC UM SN cycle). If the network happens to encode the PDUs with corresponding SN X and SN X+1 in the reverse order, such as SN X+1 and SN X then the PDU correspond with X+1 may be handled assuming the PDU corresponding with X is missing. As a result, PDU corresponding with X is handled assuming it is received after rollover event has occurred. This may result in erroneous decoding of the received PDU and the following in-sequence PDUs as well. As a result, call failure may occur either in the signaling plane or data plane.

As such, according to aspects of the present methods and apparatus, one or more call performance and data throughput improvement techniques may be implemented to alleviate or otherwise prevent processing of out-of-order PDUs by a UE. In one aspect, the methods and apparatus my improve call performance and data throughput by receiving one or more PDUs during a transmission time interval (TTI) from a network entity; determining one or more out-of-order PDUs from the one or more PDUs; reordering the one or more out-of-order PDUs; and processing the one or more reordered PDUs. Accordingly, in some aspects, the present methods and apparatuses may provide an efficient solution, as compared to current solutions, to improve call performance and data throughput.

Referring to FIG. 1, in one aspect, a wireless communication system 10 includes at least one UE 12 in communication coverage of at least one network entity 14 (e.g., base station). For instance, UE 12 may communicate with network 16 by way of network entity 14. Moreover, UE 12 may communicate with network entity 14 via one or more communication channels 18 utilizing one or more air interfaces. In such aspects, the one or more communication channels 18 may enable communication on one or both of the uplink and the downlink. Further, communication on the one or more communication channels 18 may include communication of one or more PDUs 20. For instance, PDUs 20 may include radio link control (RLC) unacknowledged mode (UM) PDUs.

In some aspects, UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entity 14 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

According to the present aspects, UE 12 may include reconfiguration component 22, which may be configured to reconfigure communication (e.g., physical channel reconfiguration) with a network entity in response to receiving a reconfiguration message from the network entity. For instance, reconfiguration component 22 may be configured to obtain or otherwise receive at least one or more PDUs 20 from network entity 14 via communication component 30. The one or more of PDUs may be any one or more of plurality of PDUs 20 (e.g., $PDU_1$, $PDU_2$, $PDU_3$, $PDU_4$, $PDU_N$), where N is a positive integer. Further, PDUs 20 may include one or both of signaling radio bearer (SRB) data and radio bearer (RB) data and may be received during a TTI. However, in some cases, not all of the PDUs 20 may be received at UE 12. Such cases may lead to poor wireless service experiences, such as call drops, when PDUs containing RB data for facilitating configuration are not received. Hence, to address such deficiencies, reconfiguration component 22 may include determination component 24.

In an aspect, determination component 24 may be configured to determine one or more out-of-order PDUs during a TTI from the network entity 14. For instance, determination component 24 may determine the one or more out-of-order PDUs from the one or more PDUs (e.g., $PDU_1$, $PDU_2$, $PDU_3$, $PDU_4$, $PDU_N$) by determining a SN of a first PDU (e.g., SN of $PDU_1$) and a SN of a second PDU (e.g., SN of $PDU_2$). As a result, determination component 24 may determine that the SN of the second PDU is less than the SN of the first PDU. As such, determination component 24 may output an out-of-order indication. It should be noted that determining one or more out-of-order PDUs occurs at a Radio Link Control (RLC) layer entity.

In further aspects, reconfiguration component 22 may include reorder component 25, which may configured to reorder the one or more out-of-order PDUs. For instance, reorder component 25 may reorder the one or more out-of-order PDUs by reordering the SN of the first PDU (e.g., SN of $PDU_1$) and a SN of a second PDU (e.g., SN of $PDU_2$). Reorder component 25 may reorder the one or more out-of-order PDUs based on receiving the out-of-order indication from the determination component 24. Further, reorder component 25 may reorder the one or more out-of-order PDUs continuously after determining one or more out-of-order PDUs from the one or more PDUs, or reorder component 25 may reorder the one or more out-of-order PDUs after determining all out-of-order PDUs during the TTI. As a result, reorder component 25 may output the reordered PDUs.

In some aspects, reconfiguration component 22 may include rollover component 26, which may be configured to determine a rollover trigger after the reorder component 25 reorders the one or more out-of-order PDUs, and increment a rollover counter value based at least in part on determining the rollover trigger. In such aspects, rollover trigger may be based at least in part on one or more SNs of the one or more reordered PDUs. In some aspects, determining the rollover trigger after reordering the out-of-order PDUs may prevent an incorrect rollover trigger from occurring due to missing or out-of-order PDUs. In such aspects, a correct rollover trigger may synchronize the processing of the PDUs 20 since the frame will be correctly adjusted.

In another aspect, UE 12 may include processing component 28, which may be configured to process the reordered PDUs based at least in part on the rollover counter value. For instance, reconfiguration component 22 and/or rollover component 26 may output the rollover counter value to processing component 28. Additionally, processing component 28 may receive the reordered PDUs from reconfiguration component 22 and/or reorder component 25, and process the reordered PDUs based the rollover counter value.

In additional aspects, UE 12 may include communication component 30, which may be configured to transmit and receive data and/or voice communication (e.g., PDUs 20) on one or more communication channels 18 with one or more network entities (e.g., network entity 14). For example, in an aspect, the communication component 30 may receive at least one or more PDUs 20 from one or more network entities (e.g., network entity 14), and/or may transmit one or more messages to the network entity. Further, communication component 30 may include, but is not limited to, one or more of a transmitter, a receiver, a transceiver, protocol stacks, transmit chain components, and receive chain components.

Figure 2:
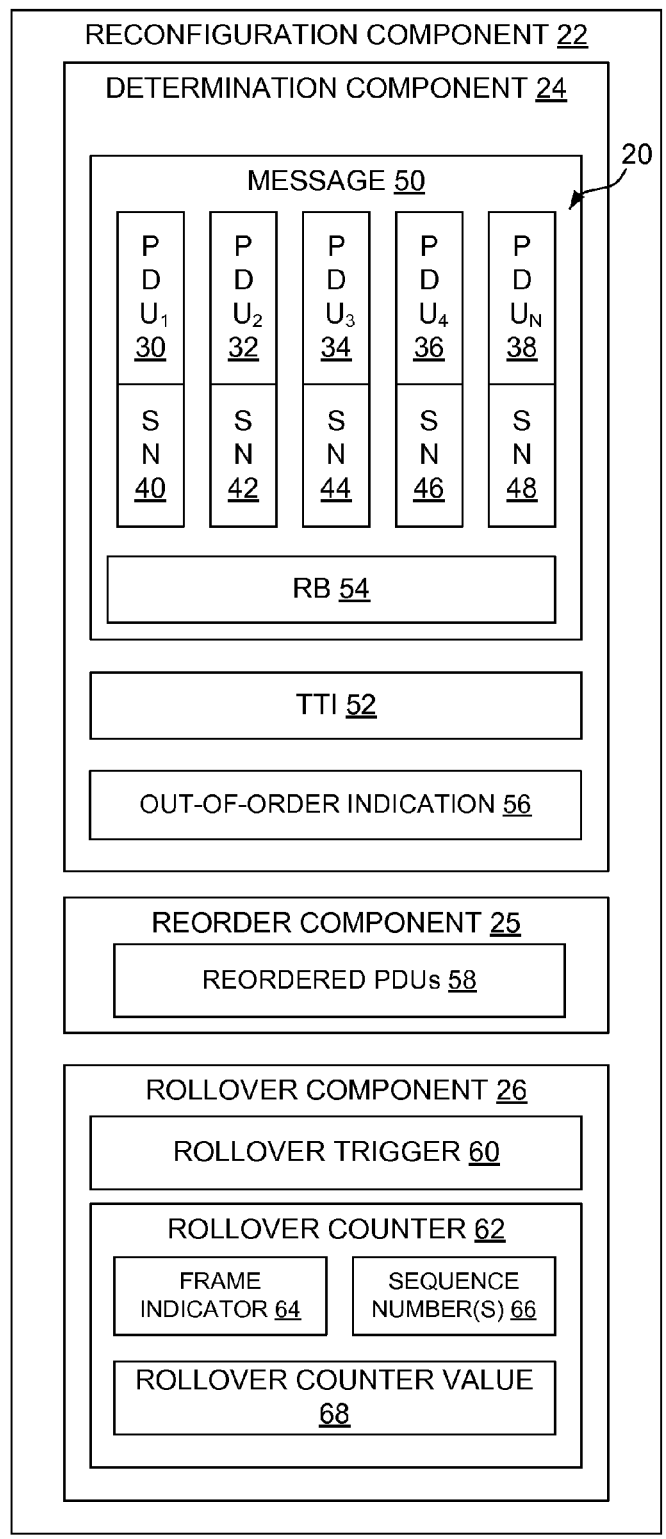
FIG. 2 is a schematic diagram of an aspect of the reconfiguration component of FIG. 1.

Referring to FIG. 2, an aspect of the reconfiguration component 22 may include various components and/or subcomponents, which may be configured to facilitate enhanced reconfiguration (e.g., physical channel reconfiguration). For instance, reconfiguration component 22 may improve call performance and data throughput by reordering out-of-order PDUs received from the network. The various component/subcomponents described herein enable reconfiguration component 22 to achieve such improved call performance and data throughput.

In an aspect, reconfiguration component 22 may include determination component 24. For instance, determination component 24 may be configured to receive one or more PDUs as part of message 50 from communication component 30 (FIG. 1). Message 50 may correspond to one or more messages or one or more PDUs 20 (FIG. 1). It should be understood that any one or more messages may each include one or more PDUs. In a non-limiting case, for example, message 50 may include $PDU_1$ 30, $PDU_2$ 32, $PDU_3$ 34, $PDU_4$ 36, and $PDU_N$ 38, with N being any number greater than four. Additionally, message 50 may include corresponding SN 40, SN 42, SN 44, SN 46, and SN 48 for each of the one or more PDUs, with N being any number greater than four. Further, message 50 may include radio bearer (RB) 54. As such, each of the one or more PDUs (e.g., $PDU_1$ 30-$PDU_N$ 38) may correspond to the one or more SNs (e.g., SN 40-SN 48) and a RB 54. It should be understood that any one PDU, or any combination of the PDUs shown as part of, or forming message 50, may be considered as one or more PDUs. In some aspects, determination component 54 may determine TTI 52. In a non-limiting case, for example, TTI 52 may correspond to the current TTI that is configured between UE 12 and network entity 14.

Additionally, determination component 24 may output out-of-order indication 56 based on determining that one or more of the PDUs (e.g., $PDU_1$ 30-$PDU_N$ 38) are out-of-order. In this instance, determination component 24 may determine a SN of a first PDU (e.g., SN 40 of $PDU_1$ 30) and a SN of a second PDU (e.g., SN 42 of $PDU_2$ 32). In an instance, determination component 24 may determine that the second PDU 32 is received after the first PDU 30, but second PDU 32 may have a corresponding SN (e.g., SN 42) that is less than the SN (e.g., SN 40) of the first PDU 30. For example, SN 40 may have a value of 5 while SN 42 may have a value 3 (e.g., less than the value of SN 40). However, since PDU 30 was received prior to PDU 32, determination component 24 may determine that PDU 30 was received out-of-order since PDU 30 has a SN value of 5 (e.g., corresponding to SN 40) while PDU 32 has a SN value of 3 (e.g., corresponding to SN 42). As a result, determination component 24 may output out-of-order indication 56 based on the determination.

Further, determination component 24 may include reorder component 25, which may be configured to reorder the one or more out-of-order PDUs (e.g., $PDU_1$ 30-$PDU_N$ 38). For instance, reorder component 25 may reorder the out-of-order PDUs based on their corresponding SNs (e.g., SN 40-SN 48). Reorder component 25 may reorder the one or more out-of-order PDUs based on receiving the out-of-order indication 56 from the determination component 24. In one aspect, reorder component 25 may reorder the one or more out-of-order PDUs by reordering the SN of the first PDU (e.g., SN 40 of PDU$_1$ 30) and a SN of a second PDU (e.g., SN 42 of PDU$_2$ 32). Moreover, reorder component 25 may reorder the one or more out-of-order PDUs continuously after determining one or more out-of-order PDUs from the one or more PDUs, or reorder component 25 may reorder the one or more out-of-order PDUs after determining all out-of-order PDUs during the TTI. As a result, the PDUs will be reordered in sequential order based on their corresponding SNs, and reorder component 25 may output reordered PDUs 58. Thus, the RLC sequence numbers within a transport block size (e.g., message 50) are being reordered by the determination component 24.

In some aspects, determination component 24 may include rollover component 26, which may be configured to determine a rollover trigger 60 after reordering the one or more out-of-order PDUs. In an instance, rollover component 26 may receive the reordered PDUs 58 and determine based on the SNs of the reordered PDUs 58 that a rollover has occurred. In such aspects, since the reordered PDUs 58 are in sequential order, rollover component 26 examines the SNs of the reordered PDUs 58. Since a SN is 7 bits in length with a maximum value of 127, rollover component 26 may determine that a SN of one of the reordered PDUs 58 has a value of 127, and that a subsequent SN of one of the reordered PDUs 58 has a value of 0. As a result, rollover component 26 may determine that a rollover has occurred and will output a rollover trigger 60 which indicates that the frame has changed.

Additionally, rollover component 26 may include rollover counter 62, which may be configured to increment a rollover counter value 68 based at least in part on determining the rollover trigger 60. In some aspects, the rollover counter value 68 may be based at least in part on frame indicator 64 and one or more SNs 66. Frame indicator 64 may accordingly be a hyper frame number indicator (HFNI), and the one or more SNs 66 may be Radio Link Control (RLC) SNs. In some aspects, rollover counter 62 may increment frame indicator 64 which in turn will result in the rollover counter value 68 being incremented. As a result, rollover component 26 may output the rollover counter value 68 that may be used to properly synchronize the processing of the reordered PDUs 58 by processing component 28 (FIG. 1).

Figure 3:
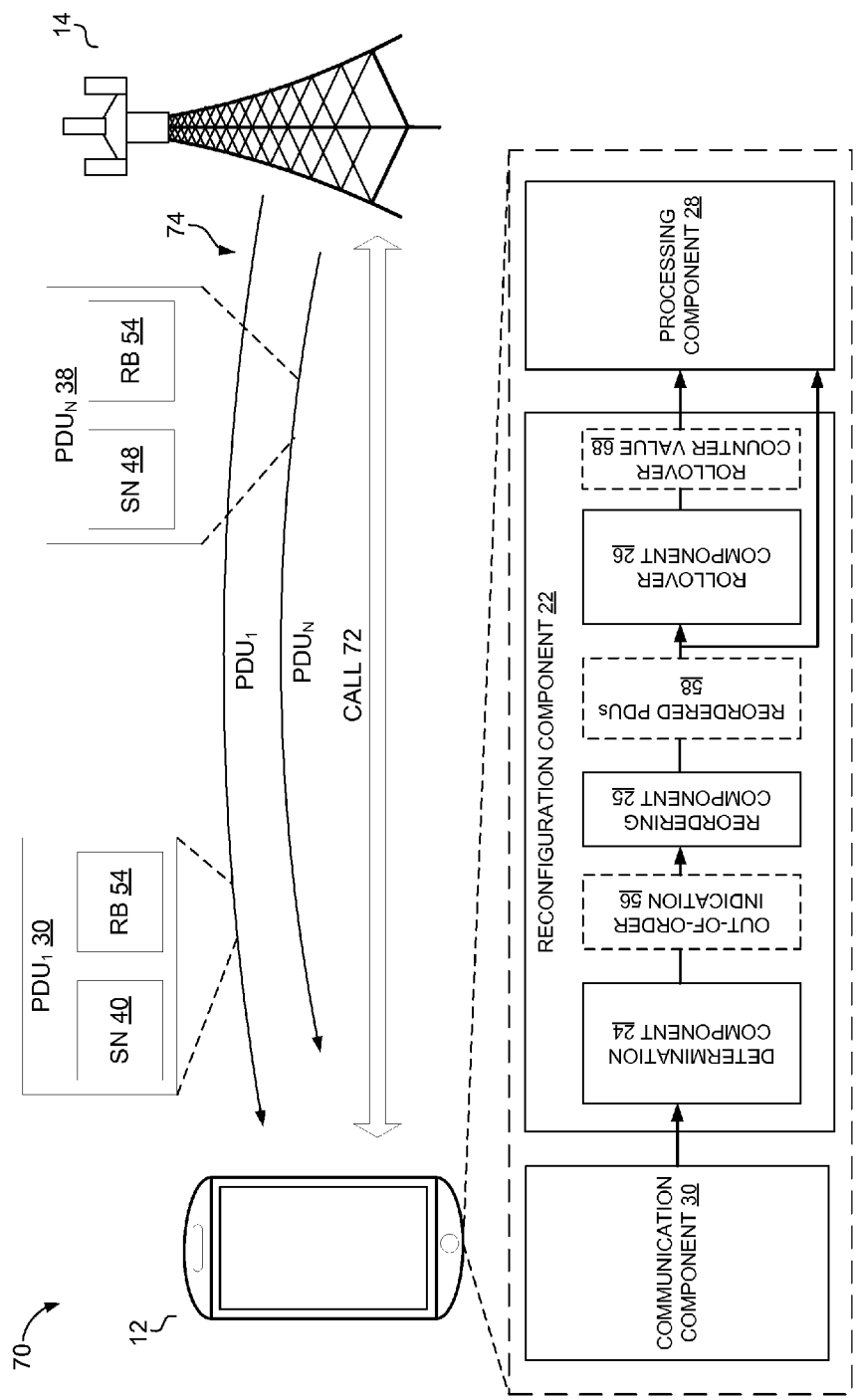
FIG. 3 is a conceptual diagram of a communication arrangement between a user equipment and a network entity, according to FIG. 1.

Referring to FIG. 3, an example conceptual diagram of a reconfiguration event is illustrated. In this example, a call 72 between UE 12 is established and/or is ongoing via network entity 14. Further, due to mobility scenarios, network entity 14 may send UE 12 one or more PDUs (e.g., PDUs 20) during a TTI. However, as a result of poor network conditions and/or poor connection, message 74 (similar to message 50 in FIG. 2) may not have been received in its entirety, and/or one or more of the PDUs may be received out-of-order. That is, the one or more PDUs (e.g., PDU$_1$ 30 and PDU$_N$ 38) may be received in a different order from how they were sent by the network entity 14. Further, the one or more PDUs (e.g., PDU$_1$ 30 and PDU$_N$ 38) may comprise corresponding SNs and RBs (e.g., SN 40 and SN 48 and RB 54).

Upon reception, communication component 30 may transmit the one or more PDUs to reconfiguration component 22 and/or determination component 24 which in turn will determine one or more out-of-order PDUs from the one or more PDUs (e.g., PDU$_1$ 30 and PDU$_N$ 38). As a result, determination component 24 may output an out-of-order indication 56 to reordering component 25 which may reorder the one or more out-of-order PDUs in response to receiving the out-of-order indication 56. In response, reorder component 25 may output reordered PDUs 58 to both rollover component 26 and processing component 28. Upon receiving reordered PDUs 58, rollover component 26 may determine whether a rollover has occurred and output a rollover counter value 68 to processing component 28. As such, processing component 28 receives reordered PDUs 58 and rollover counter value 68 from reconfiguration component 22, and processes the reordered PDUs 58 along with rollover counter value 68.

Figure 4:
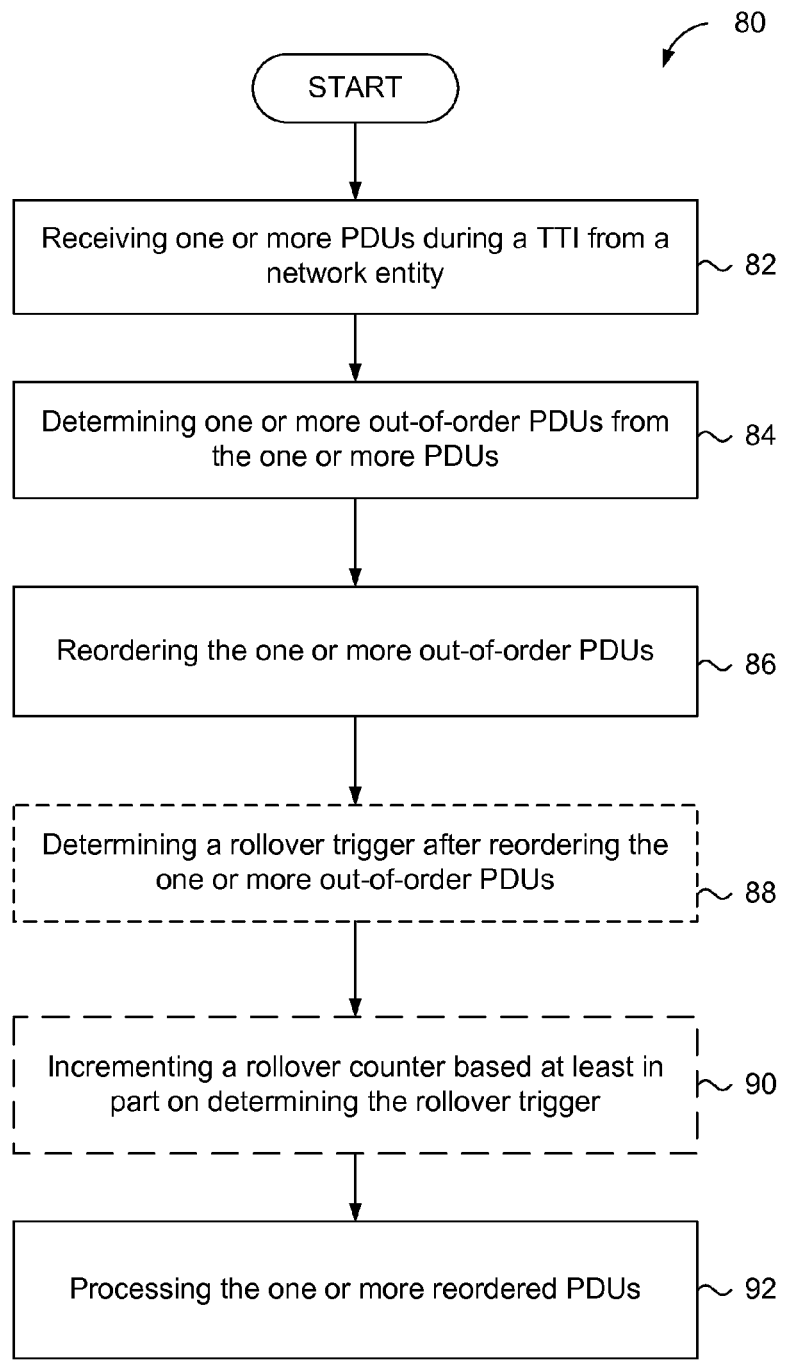
FIG. 4 is a flowchart of an aspect of the status retransmission features at a user equipment, according to FIG. 1.

Referring to FIG. 4, in operation, a UE such as UE 12 (FIG. 1) may perform one aspect of a method 80 for improving call performance and data throughput. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 82, method 80 includes receiving one or more PDUs during a TTI from a network entity. For example, as described herein, UE 12 may execute communication component 30 (FIG. 1) to receive one or more PDUs (e.g., PDUs 20 comprising PDU$_1$-PDU$_N$) of a message 50 (FIG. 2) from a network entity 14 (FIG. 1). In some aspects, the one or more PDUs may include at least one of a signaling radio bearer (SRB) data and radio bearer data (e.g., radio bearer (RB) 54, FIG. 2). Further, one or more PDUs (e.g., PDUs 20 comprising PDU$_1$-PDU$_N$) may be received during a TTI (e.g., TTI 52, FIG. 2).

Moreover, at block 84, method 80 includes determining one or more out-of-order PDUs from the one or more PDUs. For instance, as described herein, reconfiguration component 22 (FIGS. 1 and 2) may execute determination component 24 to determine one or more out-of-order PDUs from the one or more PDUs (e.g., PDUs 20 comprising PDU$_1$-PDU$_N$). In an aspect, the one or more PDUs 20 may be sent as part of a message 50 (FIG. 2) comprising one or more PDUs (e.g., PDU$_1$ 30, PDU$_2$ 32, PDU$_3$ 36, PDU$_4$ 36, PDU$_N$ 38) along with corresponding sequence numbers (SN) (SN 40, SN 42, SN 44, SN 46, SN 48). The one or more PDUs (e.g., PDUs 20) may include corresponding SNs when sent from the network entity 14. Further, reconfiguration component 22 (FIGS. 1 and 2) may execute determination component 24 to determine a SN of a first PDU (e.g., SN 40 corresponding to PDU1 30) of the one or more PDUs (e.g., PDUs 20) and a SN of a second PDU (e.g., SN 42 corresponding to PDU2 32) of the one or more PDUs (e.g., PDUs 20). In some aspects, the second PDU may be received after the first PDU during the TTI. As such, reconfiguration component 22 (FIGS. 1 and 2) may execute determination component 24 to determine that the SN of the second PDU is less than the SN of the first PDU. As a result, reconfiguration component 22 (FIGS. 1 and 2) may execute determination component 24 to output an out-of-order indication 56 (FIG. 2) based at least in part on determining that one or more PDUs are out-of-order.

At block 86, method 80 may include reordering the one or more out-of-order PDUs. For example, as described herein, reconfiguration component 22 (FIGS. 1 and 2) may execute reorder component 25 to reorder the one or more out-of-order PDUs. In some aspects, reorder component 25 may receive the out-of-order indication 56 from determination component 24, and reorder the SN of the first PDU and the SN of the second PDU in sequential order. Further, this process is repeated for any PDUs that may be indicated as out-of-order. As a result, the one or more out-of-order PDUs will be reordered as reordered PDUs 58, so that their SNs will be in sequential order. Additionally, reordering the one or more out-of-order PDUs may occur either continuously after determining one or more out-of-order PDUs from the one or more PDUs (e.g., PDUs 20), or reordering the one or more out-of-order PDUs may occur after determining all out-of-order PDUs during the TTI 52.

Further, at block 88, method 80 may optionally include determining a rollover trigger after reordering the one or more out-of-order PDUs. For instance, as described herein, reconfiguration component 22 (FIGS. 1 and 2) may execute retransmission rollover component 26 to determine a rollover trigger 60 after reordering the one or more out-of-order PDUs. In some aspects, rollover component 26 determines the rollover trigger 60 based on the reordered PDUs 58 received from reorder component 25. In such aspects, since the reordered PDUs 58 are in sequential order, rollover component 26 examines the SNs of the reordered PDUs 58. Since a SN is 7 bits in length with a maximum value of 127, rollover component 26 may determine that a SN of one of the reordered PDUs 58 has a value of 127, and that a subsequent SN of one of the reordered PDUs 58 has a value of 0. As a result, rollover component 26 may determine that a rollover has occurred and will output a rollover trigger 60.

Additionally, at block 90, method 80 may optionally include incrementing a rollover counter based at least in part on determining the rollover trigger. For example, as described herein, reconfiguration component 22 (FIGS. 1 and 2) may execute rollover component 26 to increment a rollover counter value 68 based at least in part on determining the rollover trigger 60. In an aspect, rollover counter 62 may increment and output the rollover counter value 68 which may be based at least in part on frame indicator 64 and one or more SNs 66. Frame indicator 64 may accordingly be a hyper frame number indicator (HFNI), and the one or more SNs 66 may be Radio Link Control (RLC) SNs. In some aspects, rollover counter 62 may increment frame indicator 64 which in turn will result in the rollover counter value 68 being incremented. As a result, rollover component 26 may output the rollover counter value 68 that may be used to properly synchronize the processing of the reordered PDUs 58.

At block 92, method 80 may include processing the one or more reordered PDUs 92. For instance, as described herein, UE 12 (FIG. 1) may execute processing component 28 (FIG. 1) to process the one or more reordered PDUs 58. In an aspect, processing component 28 receives the one or more reordered PDUs 58 from reconfiguration component 22 and/or reorder component 25 along with rollover counter value 68 from reconfiguration component 22 and/or rollover component 26. As a result, processing component 28 processes the one or more reordered PDUs 58 based at least in part on the rollover counter value 68 so as to identify the correct frame.

Figure 5:
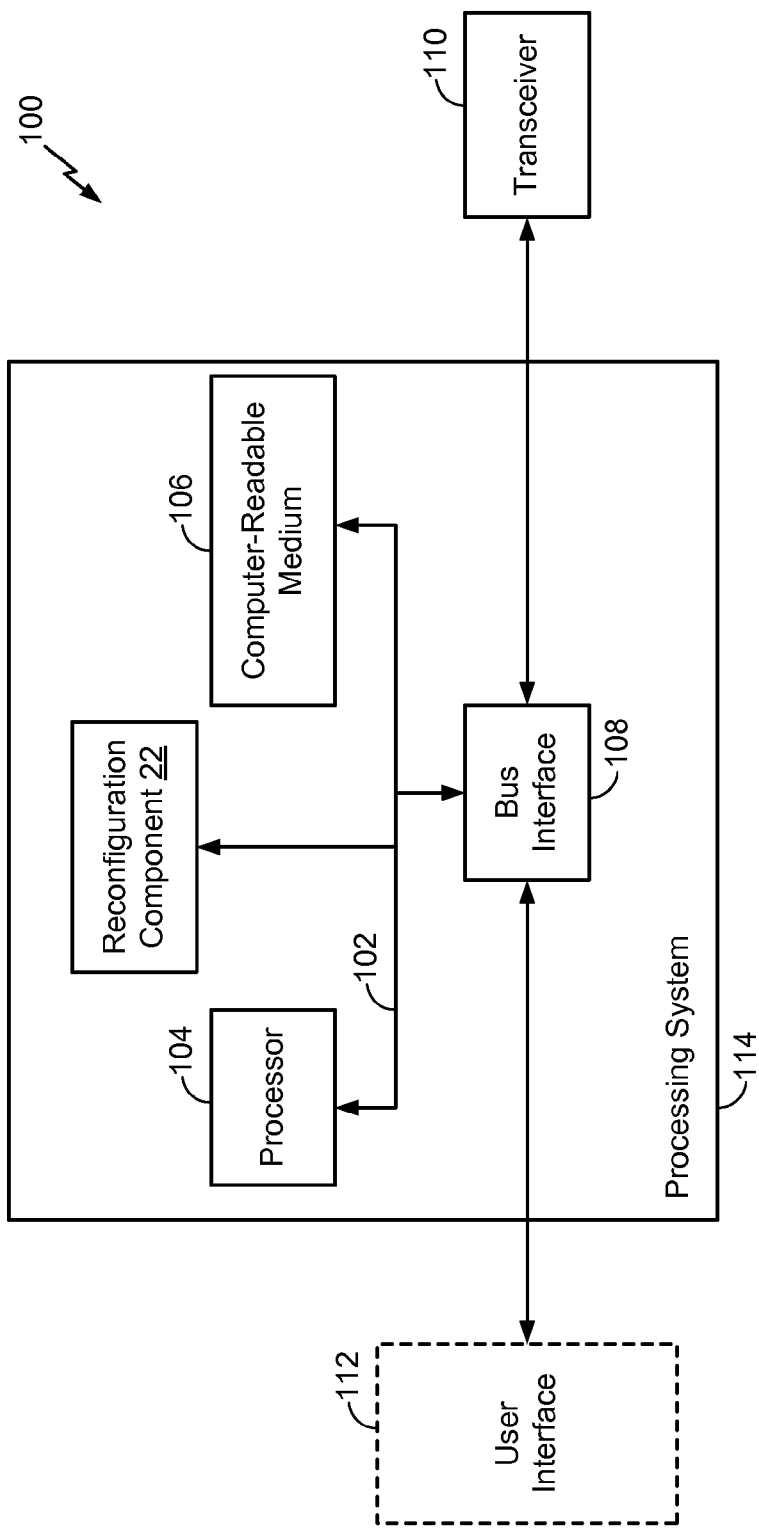
FIG. 5 is a block diagram illustrating an example of a hardware implementation for an apparatus employing a processing system, according to FIG. 1.

FIG. 5 is a block diagram illustrating an example of a hardware implementation for an apparatus 100 employing a processing system 114, wherein the system may be the same as or similar to UE 12 executing reconfiguration component 22 (FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106 and UE components (e.g., UE 12), such as reconfiguration component 22 (FIG. 1).

The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Further, reconfiguration component 22 (FIG. 1) may be implemented by any one or more of processor 104 and computer-readable medium 106. For example, the processor and/or computer-readable medium 106 may be configured to, via reconfiguration component 22, determine one or more out-of-order PDUs, reorder the one or more out-of-order PDUs, and process the reordered PDUs in a wireless communications device (e.g., UE 12).

The various concepts presented throughout this disclosure may be implemented across a broad variety of telecommunication systems, network architectures, and communication standards.

Figure 6:
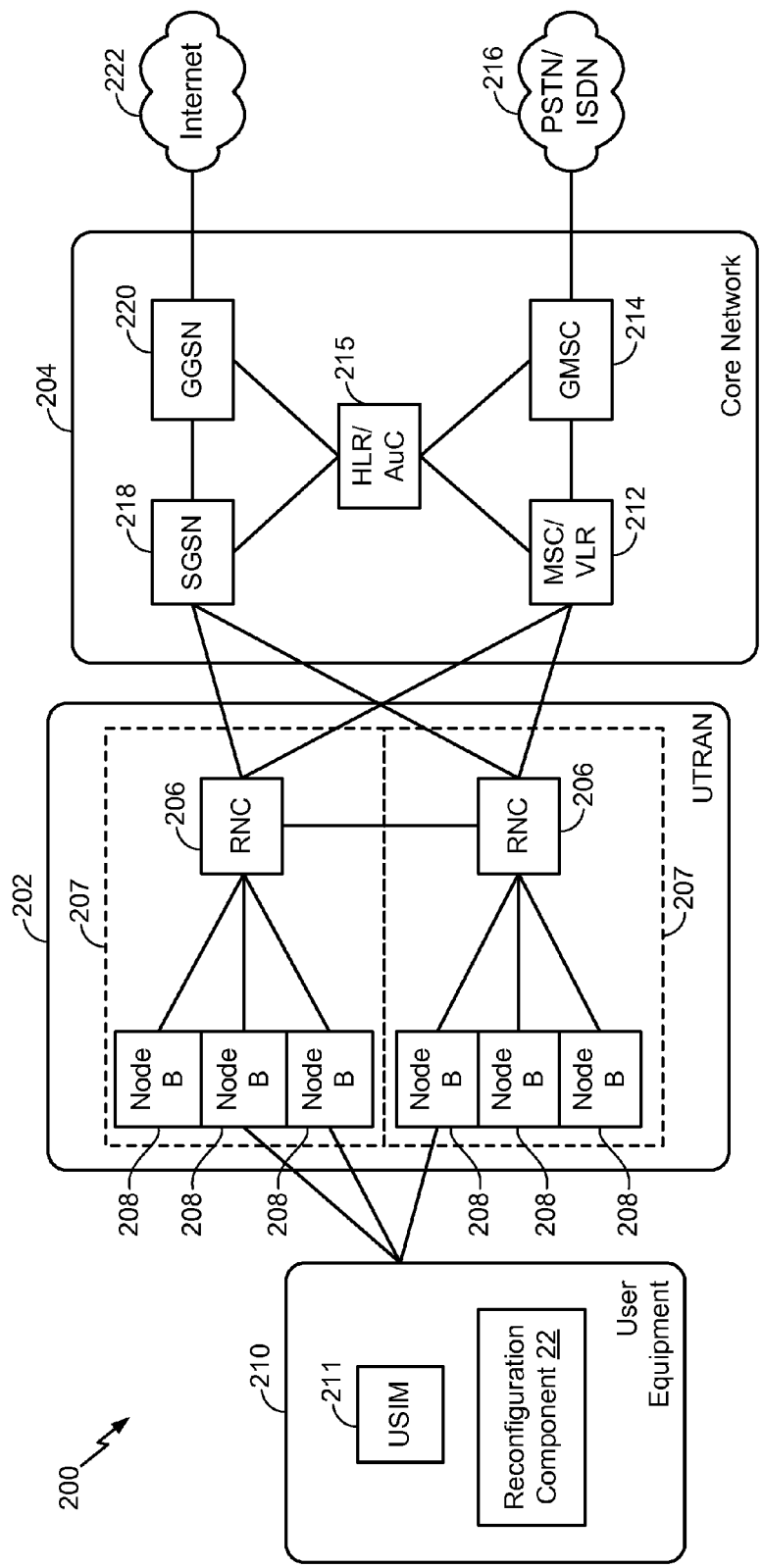
FIG. 6 is a block diagram conceptually illustrating an example of a telecommunications system, according to FIG. 1.

Referring to FIG. 6, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210 that may be the same or similar as UE 12 including reconfiguration component 22 (FIG. 1). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses, such as UE 210. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
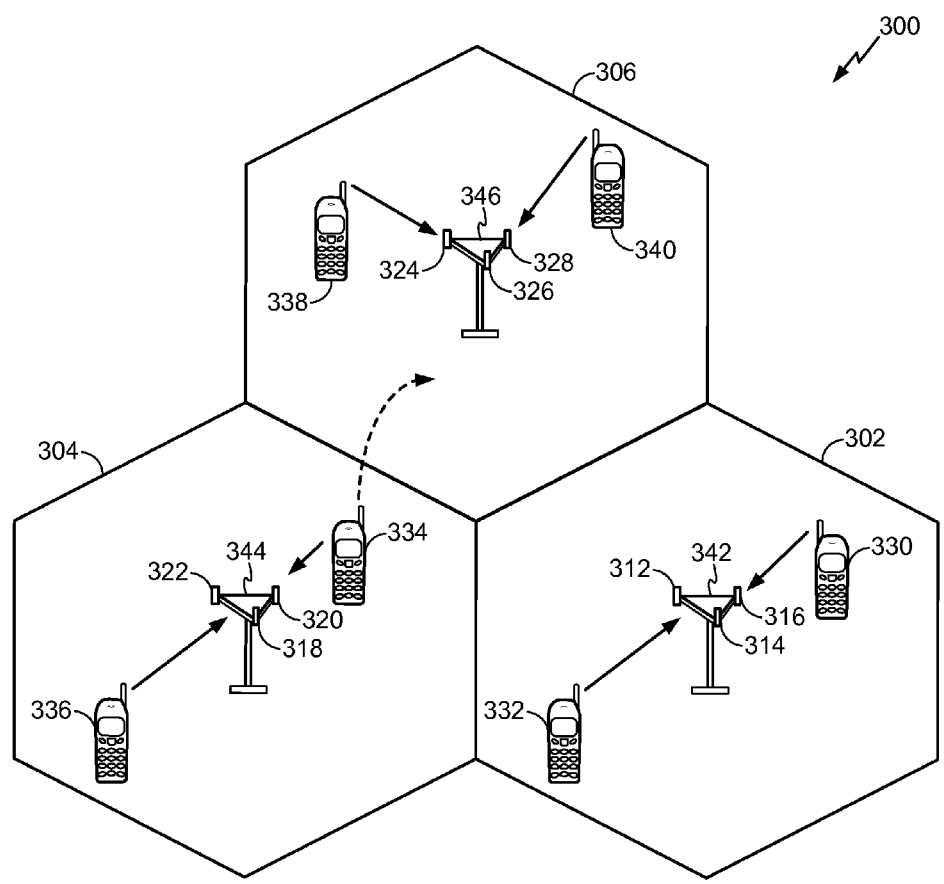
FIG. 7 is a conceptual diagram illustrating an example of an access network including an aspect of the user equipment described herein.

Referring to FIG. 7, an access network 300 in a UTRAN architecture is illustrated in which UE, such as a UE the same as or similar to UE 12 including reconfiguration component 22 (FIG. 1) may operate. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306. In an aspect, the UEs 330, 332, 334, 336, 338 and/or 340 may include reconfiguration component 22 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
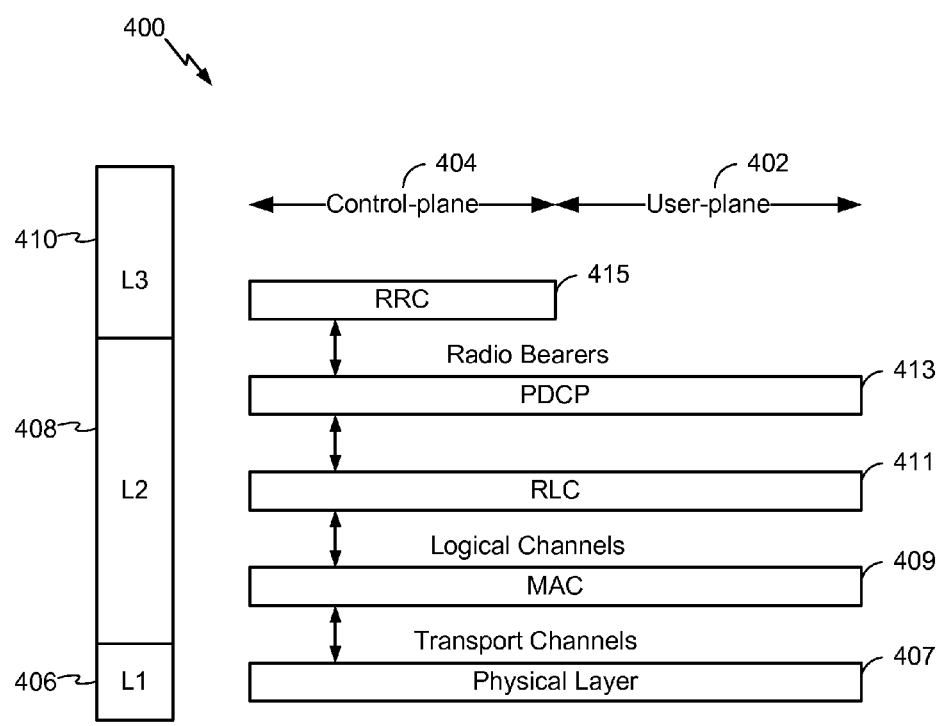
FIG. 8 is a conceptual diagram illustrating an example of a radio protocol architecture for the user and control plane including an aspect of the user equipment described herein.

Referring to FIG. 8, an example radio protocol architecture 400 relates to the user plane 402 and the control plane 404 of a user equipment (UE) or node B/base station. For example, architecture 400 may be included in a UE such as UE 12 including reconfiguration component 22 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
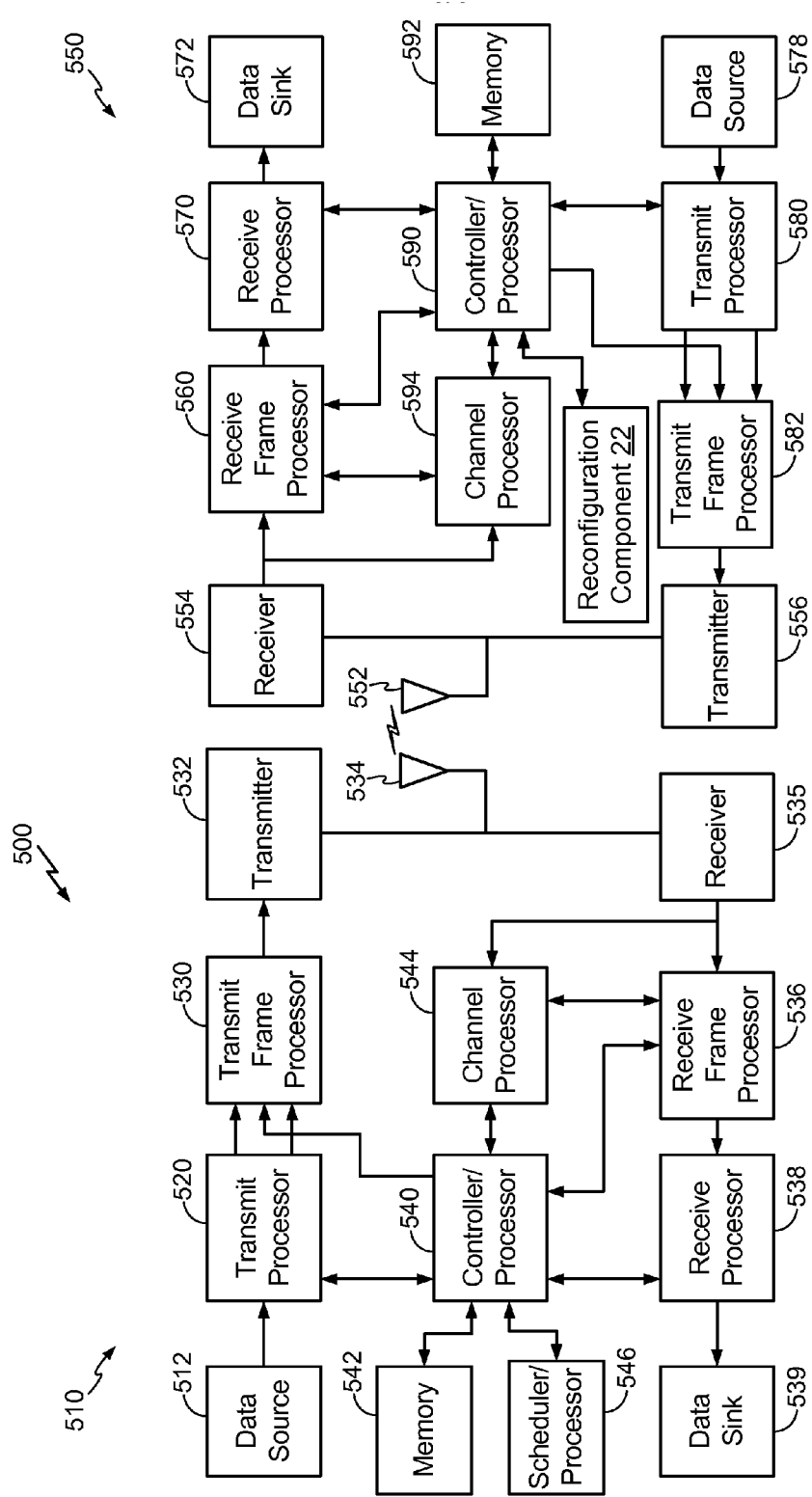
FIG. 9 is a block diagram conceptually illustrating an example of a Node B in communication with a UE in a telecommunications system, according to FIG. 1.

FIG. 9 is a block diagram of a Node B 510 in communication with a UE 550, where the Node B 510 may be the Node B 208 in FIG. 5, and the UE 550 may be the UE 210 in FIG. 6 or the UE 12 including reconfiguration component 22 in FIG. 1 and its corresponding functions described in FIGS. 2-5. Reconfiguration component 22 may be configured to improve call performance and data throughput. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. The controller/processor 590 may include and/or communicate with reconfiguration component 22 operable to improve call performance and data throughput. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communication, comprising:
    receiving one or more packet data units (PDUs) during a transmission time interval (TTI) from a network entity, wherein the one or more PDUs are associated with a radio bearer;
    determining one or more out-of-order PDUs from the one or more PDUs, wherein determining the one or more out-of-order PDUs includes outputting an out-of-order indication based on determining that the one or more PDUs received during the TTI are out-of-order;
    reordering the one or more out-of-order PDUs based on the out-of-order indication, wherein the one or more out-of-order PDUs are reordered within the TTI;
    determining a rollover trigger after reordering the one or more out-of-order PDUs, wherein the rollover trigger is based at least in part on one or more sequence numbers of the one or more reordered PDUs;
    incrementing a rollover counter value based at least in part on determining the rollover trigger, wherein the rollover counter value is based at least in part on a frame indicator and the one or more sequence numbers; and
    processing the one or more reordered PDUs in response to incrementing the rollover counter value.

2. The method of claim 1, wherein determining the one or more out-of-order PDUs from the one or more PDUs comprises:
    determining a sequence number of a first PDU of the one or more PDUs and a sequence number of a second PDU of the one or more PDUs, wherein the second PDU is received after the first PDU during the TTI; and
    determining that the sequence number of the second PDU is less than the sequence number of the first PDU.

3. The method of claim 2, wherein reordering the one or more out-of-order PDUs comprises reordering the sequence number of the first PDU and the sequence number of the second PDU in sequential order.

4. The method of claim 1, wherein incrementing the rollover counter value comprises incrementing the frame indicator.

5. The method of claim 1, wherein the indicator is a hyper frame number indicator (HFNI) and the one or more sequence numbers are one or more Radio Link Control (RLC) sequence numbers.

6. The method of claim 1, wherein the processing of the one or more reordered PDUs comprises processing the one or more reordered PDUs based at least in part on the rollover counter value.

7. The method of claim 1, wherein reordering the one or more out-of-order PDUs occurs continuously after determining one or more out-of-order PDUs from the one or more PDUs.

8. The method of claim 1, wherein reordering the one or more out-of-order PDUs occurs after determining all out-of-order PDUs during the TTI.

9. The method of claim 1, wherein determining the one or more out-of-order PDUs from the one or more PDUs occurs at a Radio Link Control (RLC) layer entity.

10. The method of claim 1, wherein the one or more PDUs comprise one or more Radio Link Control (RLC) unacknowledged mode (UM) PDUs.

11. A non-transitory computer-readable medium storing computer executable code for communication, comprising:
    code for receiving one or more packet data units (PDUs) during a transmission time interval (TTI) from a network entity, wherein the one or more PDUs are associated with a radio bearer;
    code for determining one or more out-of-order PDUs from the one or more PDUs, wherein the code for determining the one or more out-of-order PDUs includes code for outputting an out-of-order indication based on determining that the one or more PDUs received during the TTI are out-of-order;
    code for reordering the one or more out-of-order PDUs based on the out-of-order indication, wherein the one or more out-of-order PDUs are reordered within the TTI;
    code for determining a rollover trigger after reordering the one or more out-of-order PDUs, wherein the rollover trigger is based at least in part on one or more sequence numbers of the one or more reordered PDUs;
    code for incrementing a rollover counter value based at least in part on determining the rollover trigger, wherein the rollover counter value is based at least in part on a frame indicator and the one or more sequence numbers; and
    code for processing the one or more reordered PDUs in response to incrementing the rollover counter value.

12. An apparatus for communication, comprising:
    means for receiving one or more packet data units (PDUs) during a transmission time interval (TTI) from a network entity, wherein the one or more PDUs are associated with a radio bearer;
    means for determining one or more out-of-order PDUs from the one or more PDUs, wherein the means for determining the one or more out-of-order PDUs includes means for outputting an out-of-order indication based on determining that the one or more PDUs received during the TTI are out-of-order;
    means for reordering the one or more out-of-order PDUs based on the out-of-order indication, wherein the one or more out-of-order PDUs are reordered within the TTI;
    means for determining a rollover trigger after reordering the one or more out-of-order PDUs, wherein the rollover trigger is based at least in part on one or more sequence numbers of the one or more reordered PDUs;
    means for incrementing a rollover counter value based at least in part on determining the rollover trigger, wherein the rollover counter value is based at least in part on a frame indicator and the one or more sequence numbers; and
    means for processing the one or more reordered PDUs in response to incrementing the rollover counter value.

13. An apparatus for communication, comprising: a memory storing executable instructions; and
    a processor in communication with the memory, wherein the processor is configured to execute the instructions to:
        receive one or more packet data units (PDUs) during a transmission time interval (TTI) from a network entity, wherein the one or more PDUs are associated with a radio bearer;
        determine one or more out-of-order PDUs from the one or more PDUs, wherein the processor configured to determine the one or more out-of-order PDUs is further configured to output an out-of-order indication based on determining that the one or more PDUs received during tile TTI are out-of-order;
        reorder the one or more out-of-order PDUs based on the out-of-order indication, wherein the one or more out-of-order PDUs are reordered within the TTI;

determine a rollover trigger after reordering the one or more out-of-order PDUs, wherein the rollover trigger is based at least in part on one or more sequence numbers of the one or more reordered PDUs;

increment a rollover counter value based at least in part on determining the rollover trigger, wherein the rollover counter value is based at least in part on a frame indicator and the one or more sequence numbers; and process the one or more reordered PDUs in response to incrementing the rollover counter value.

14. The apparatus of claim 13, wherein the instructions to determine the one or more out-of-order PDUs from the one or more PDUs further comprise instructions to:

determine a sequence number of a first PDU of the one or more PDUs and a sequence number of a second PDU of the one or more PDUs, wherein the second PDU is received after the first PDU during the TTI; and determine that the sequence number of the second PDU is less than the sequence number of the first PDU.

15. The apparatus of claim 14, wherein the instructions to reorder the one or more out-of-order PDUs further comprise instructions to reorder the sequence number of the first PDU and the sequence number of the second PDU in sequential order.

16. The apparatus of claim 14, wherein the instructions to increment the rollover counter value further comprises instructions to increment the frame indicator.

17. The apparatus of claim 14, wherein the indicator is a hyper frame number indicator (HFNI) and the one or more sequence numbers are one or more Radio Link Control (RLC) sequence numbers.

18. The apparatus of claim 14, wherein the instructions to process of the one or more reordered PDUs further comprises instructions to process the one or more reordered PDUs based at least in part on the rollover counter value.

19. The apparatus of claim 13, wherein the instructions to reorder the one or more out-of-order PDUs occurs continuously after determining one or more out-of-order PDUs from the one or more PDUs.

20. The apparatus of claim 13, wherein the instructions to reorder the one or more out-of-order PDUs occurs after determining all out-of-order PDUs during the TTI.

21. The apparatus of claim 13, wherein the instructions to determine the one or more out-of-order PDUs from the one or more PDUs occurs at a Radio Link Control (RLC) layer entity.

22. The apparatus of claim 13, wherein the one or more PDUs comprise one or more Radio Link Control (RLC) unacknowledged mode (UM) PDUs.

* * * * *